(12) United States Patent
Li et al.

(10) Patent No.: US 12,404,430 B2
(45) Date of Patent: Sep. 2, 2025

(54) HOT MELT ADHESIVE FOR INSULATING GLASS SPACER AND PREPARATION METHOD THEREFOR

(71) Applicants: HANGZHOU ZHIJIANG ADVANCED MATERIAL CO., LTD, Zhejiang (CN); HANGZHOU ZHIJIANG SILICONE CHEMICALS CO., LTD, Zhejiang (CN)

(72) Inventors: Yunlong Li, Zhejiang (CN); Binjie Wang, Zhejiang (CN); Youzhi Chen, Zhejiang (CN); Fengfeng Li, Zhejiang (CN); Xiaole Tao, Zhejiang (CN); Ming Liu, Zhejiang (CN); Yongfu He, Zhejiang (CN)

(73) Assignees: HANGZHOU ZHIJIANG ADVANCED MATERIAL CO., LTD, Zhejiang (CN); HANGZHOU ZHIJIANG SILICONE CHEMICALS CO., LTD, Zhejiang (CN)

( * ) Notice: Subject to any disclaimer, the term of this patent is extended or adjusted under 35 U.S.C. 154(b) by 208 days.

(21) Appl. No.: 18/008,166

(22) PCT Filed: May 21, 2021

(86) PCT No.: PCT/CN2021/095108
§ 371 (c)(1),
(2) Date: Dec. 3, 2022

(87) PCT Pub. No.: WO2022/151624
PCT Pub. Date: Jul. 21, 2022

(65) Prior Publication Data
US 2023/0272251 A1 Aug. 31, 2023

(30) Foreign Application Priority Data
Jan. 18, 2021 (CN) .......................... 202110063913.8

(51) Int. Cl.
| | | |
|---|---|---|
| *C09J 123/20* | (2006.01) | |
| *C09J 11/04* | (2006.01) | |
| *C09J 11/06* | (2006.01) | |
| *C09J 11/08* | (2006.01) | |
| *E06B 3/56* | (2006.01) | |

(52) U.S. Cl.
CPC ............. *C09J 123/20* (2013.01); *C09J 11/04* (2013.01); *C09J 11/06* (2013.01); *C09J 11/08* (2013.01); *E06B 3/56* (2013.01)

(58) Field of Classification Search
CPC . C09J 123/20; C09J 11/04; C09J 11/06; C09J 11/08; E06B 3/56
USPC .......................................................... 524/579
See application file for complete search history.

(56) References Cited

U.S. PATENT DOCUMENTS

| | | | |
|---|---|---|---|
| 2012/0199199 A1* | 8/2012 | Wood | ..................... C08K 3/013 524/136 |
| 2016/0289511 A1 | 10/2016 | Sustic et al. | |

FOREIGN PATENT DOCUMENTS

| | | | |
|---|---|---|---|
| CN | 102504727 A | | 6/2012 |
| CN | 102816535 A | * | 12/2012 |
| CN | 102911625 A | | 2/2013 |
| CN | 102911625 B | * | 3/2015 |
| CN | 106753059 A | | 5/2017 |
| CN | 108641662 A | | 10/2018 |
| CN | 109096934 A | | 12/2018 |
| CN | 110499124 A | | 11/2019 |
| CN | 110819274 A | | 2/2020 |
| CN | 112795337 A | | 5/2021 |
| IN | 112795338 A | | 5/2021 |
| WO | 2005014673 A1 | | 2/2005 |

OTHER PUBLICATIONS

International Search Report for PCT/CN2021/095108 mailed Feb. 20, 2021, ISA/CN.

* cited by examiner

*Primary Examiner* — Ling Siu Cho
*Assistant Examiner* — Ronald Grinsted
(74) *Attorney, Agent, or Firm* — Yue (Robert) Xu; Apex Attorneys at Law, LLP

(57) ABSTRACT

Provided is a hot melt adhesive for insulating glass spacer, prepared from raw materials comprising the following components: 1-10 parts by weight of butyl rubber, 25-50 parts by weight of a polyisobutylene mixture; 5-15 parts by weight of a tackifying resin; 1-15 parts by weight of a tackifier; 5-15 parts by weight of a polymer; 0.1-1 part by weight of a lubricant; 0.1-1 part by weight of an antioxidant; 15-50 parts by weight of a filler; 1-10 parts by weight of a water absorbent; and 5-25 parts by weight of carbon black. Compared with the prior art, in the hot melt adhesive for insulating glass spacer provided in the present disclosure, components with specific contents are used, such that relatively good overall interaction is achieved, the thixotropy of the product is good, and the adhesion to both silicone sealant and glass is excellent.

8 Claims, No Drawings

HOT MELT ADHESIVE FOR INSULATING GLASS SPACER AND PREPARATION METHOD THEREFOR

CROSS REFERENCE TO RELATED APPLICATIONS

This application is the national phase of International Application No. PCT/CN2021/095108, titled "HOT MELT ADHESIVE FOR HOLLOW GLASS SPACER BAR AND PREPARATION METHOD THEREFOR", filed on May 21, 2021, which claims the priority to Chinese Patent Application No. 202110063913.8, titled "HOT MELT ADHESIVE FOR HOLLOW GLASS SPACER BAR AND PREPARATION METHOD THEREFOR", filed on Jan. 18, 2021 with the China National Intellectual Property Administration, which is incorporated herein by reference in entirety.

FIELD

The present disclosure relates to the field of polymer materials, and in particular to a hot melt adhesive for insulating glass spacer and a preparation method thereof.

BACKGROUND

Insulating glass, also known as heat-insulating glass, is a special glass with a dry gas space between the glasses, which is formed by two or more sheets of flat glass separated by a certain distance from each other and sealed at periphery. Insulating glass has the characteristics of heat insulation, heat preservation, sound insulation, and anti-condensation, and has a wide range of applications in architectural decoration, energy-saving vehicles and refrigeration equipment.

In order to ensure that the building meets the national energy-saving design and use requirements, at present, the most mature method in China is to use double-sealed insulating glass. Butyl hot melt adhesive is basically used as the first seal in the double-sealed system of insulating glass. The performance of the butyl hot melt adhesive plays a crucial role in the quality and life of the insulating glass.

Butyl hot melt adhesive is a one-component, solvent-free, non-fogging, non-vulcanizing, and permanent plastic first sealant for insulating glass using polyisobutylene rubber as basic material. Hot melt butyl sealant maintains its plasticity and sealing property in a wide temperature range, and its surface does not crack or harden; it has good adhesion to glass, aluminum alloy, galvanized steel, stainless steel and other materials; due to its extremely low water vapor transmission rate, it can form an excellent anti-moisture system with elastomeric sealant.

However, at present, butyl hot melt adhesives for insulating glass systems are all non-reactive hot melt adhesives and do not react with silicone, so that the interface adhesion effect is weak, which cannot play a good role in fixing. On the other hand, currently the silicone sealant on the market are often added with low-cost mineral oil as a plasticizer. Because mineral oil is non-polar, it easily migrates into the butyl hot melt adhesive, softening or even dissolving the butyl rubber, which thus flows to the inner surface of the insulating glass, affecting the waterproofness and appearance of the insulating glass. For example, Chinese Patent Publication No. CN102911625A discloses a thermoplastic spacer and a preparation method thereof, wherein the thermoplastic spacer has good chemical adhesion to glass; however, due to the low molecular weight of butyl rubber and polyolefin, they have poor resistance to mineral oil, and are easily softened by white oil, causing them to flow. On the other hand, the adhesion promoter is small molecular silane, which thus cannot effectively improve the adhesion of butyl rubber to silicone sealant.

SUMMARY

In view of this, the purpose of the present disclosure is to provide a hot melt adhesive for insulating glass spacer and a preparation method thereof. The hot melt adhesive for insulating glass spacer provided by the present disclosure has good thixotropy, and has excellent adhesion to both silicone sealant and glass.

The present disclosure provides a hot melt adhesive for insulating glass spacer, which is prepared from raw materials comprising the following components:
  1-10 parts by weight of butyl rubber;
  25-50 parts by weight of a polyisobutylene mixture;
  5-15 parts by weight of a tackifying resin;
  1-15 parts by weight of a tackifier;
  5-15 parts by weight of a polymer;
  0.1-1 part by weight of a lubricant;
  0.1-1 part by weight of an antioxidant;
  15-50 parts by weight of a filler;
  1-10 parts by weight of a water absorbent;
  5-25 parts by weight of carbon black;
  wherein the polymer is selected from one or more of styrene-butadiene rubber, an amorphous α-olefin copolymer, an ethylene-vinyl acetate copolymer, polystyrene, a styrene-butadiene-styrene copolymer, a styrene-isoprene-styrene copolymer, and a styrene-polyisobutylene-styrene copolymer.

Preferably, the butyl rubber has a viscosity-average molecular weight of 500,000-3,000,000.

Preferably, the polyisobutylene mixture is selected from two or more of low molecular weight polyisobutylene, medium molecular weight polyisobutylene and high molecular weight polyisobutylene; the low molecular weight polyisobutylene has a viscosity-average molecular weight of 1,000-30,000, the medium molecular weight polyisobutylene has a molecular weight of 30,000-100,000, and the high molecular weight polyisobutylene has a molecular weight of 100,000-2,000,000.

Preferably, the tackifying resin is selected from C5 resin and/or C9 resin.

Preferably, the tackifier is selected from one or more of polyisobutylene modified by silane coupling agent, amorphous α-polyolefin modified by silane coupling agent and metallocene catalyzed vinyl copolymer modified by silane coupling agent.

Preferably, the lubricant is selected from one or more of Fischer-Tropsch wax C80, Fischer-Tropsch wax C100, oleamide and erucamide.

Preferably, the antioxidant comprises a main antioxidant and an auxiliary antioxidant; the main antioxidant is selected from one or more of RIANOX 1010, RIANOX 1076 and RIANOX 1790, and the auxiliary antioxidant is selected from one or more of RIANOX 168, RIANOX 626, RIANOX DSTP and RIANOX DLTP.

Preferably, the filler is selected from calcium carbonate and/or talc.

Preferably, the water absorbent is selected from calcium oxide and/or molecular sieves.

The present disclosure also provides a preparation method of the hot melt adhesive for insulating glass spacer that is described in the above technical solution, comprising the following steps:

adding butyl rubber, polyisobutylene mixture, tackifying resin, tackifier, polymer, lubricant and antioxidant to a kneader successively at 130° C.-160° C., and mixing under vacuum protection for 20 min-130 min; then adding filler, water absorbent and carbon black successively, and fully mixing under vacuum protection for 60 min-180 min to obtain a hot melt adhesive for insulating glass spacer.

The invention provides a hot melt adhesive for insulating glass spacer, which is prepared from raw materials comprising the following components: 1-10 parts by weight of butyl rubber, 25-50 parts by weight of a polyisobutylene mixture; 5-15 parts by weight of a tackifying resin; 1-15 parts by weight of a tackifier; 5-15 parts by weight of a polymer; 0.1-1 part by weight of a lubricant; 0.1-1 part by weight of an antioxidant; 15-50 parts by weight of a filler; 1-10 parts by weight of a water absorbent; and 5-25 parts by weight of carbon black, wherein the polymer is selected from one or more of styrene-butadiene rubber, an amorphous α-olefin copolymer, an ethylene-vinyl acetate copolymer, polystyrene, a styrene-butadiene-styrene copolymer, a styrene-isoprene-styrene copolymer, and a styrene-polyisobutylene-styrene copolymer. Compared with the prior art, in the hot melt adhesive for insulating glass spacer provided in the present disclosure, specific contents of components are used, such that relatively good overall interaction is achieved, the thixotropy of the product is good, and the adhesion to both silicone sealant and glass is excellent.

In addition, the preparation method provided by the present disclosure has simple process, conditions easy to be controlled, and broad application prospects.

DETAILED DESCRIPTION

The technical solutions of the present disclosure will be clearly and completely described below with reference to the embodiments of the present disclosure. Obviously, the described embodiments are only a part of the embodiments of the present disclosure, rather than all the embodiments. Based on the embodiments of the present disclosure, all other embodiments obtained by those of ordinary skill in the art without creative efforts shall fall within the protection scope of the present disclosure.

The present disclosure provides a hot melt adhesive for insulating glass spacer, which is prepared from raw materials comprising the following components:

1-10 parts by weight of butyl rubber;
25-50 parts by weight of a polyisobutylene mixture;
5-15 parts by weight of a tackifying resin;
1-15 parts by weight of a tackifier;
5-15 parts by weight of a polymer;
0.1-1 part by weight of a lubricant;
0.1-1 part by weight of an antioxidant;
15-50 parts by weight of a filler;
1-10 parts by weight of a water absorbent;
5-25 parts by weight of carbon black;
wherein the polymer is selected from one or more of styrene-butadiene rubber, an amorphous α-olefin copolymer, an ethylene-vinyl acetate copolymer, polystyrene, a styrene-butadiene-styrene copolymer, a styrene-isoprene-styrene copolymer, and a styrene-polyisobutylene-styrene copolymer.

In the present disclosure, the hot melt adhesive for insulating glass spacer comprises butyl rubber, polyisobutylene mixture, tackifying resin, tackifier, polymer, lubricant, antioxidant, filler, water absorbent and carbon black, preferably consists of butyl rubber, polyisobutylene mixture, tackifying resin, tackifier, polymer, lubricant, antioxidant, filler, water absorbent and carbon black.

In the present disclosure, there is no special restriction on the source of the butyl rubber, and commercially available products well known to those skilled in the art can be used. In the present disclosure, the butyl rubber has a viscosity-average molecular weight of preferably 500,000-3,000,000, and more preferably 800,000-1,500,000.

In the present disclosure, the hot melt adhesive for insulating glass spacer comprises 1-10 parts by weight of butyl rubber, preferably 5-7 parts by weight.

In the present disclosure, the polyisobutylene mixture is preferably selected from two or more of low molecular weight polyisobutylene, medium molecular weight polyisobutylene and high molecular weight polyisobutylene; the low molecular weight polyisobutylene has a viscosity-average molecular weight of preferably 1,000-30,000, more preferably 1,300-2,000; the medium molecular weight polyisobutylene has a molecular weight of preferably 30,000-100,000, more preferably 60,000-80,000; the high molecular weight polyisobutylene has a molecular weight of preferably 100,000-2,000,000, more preferably 150,000-300,000. In the present disclosure, there is no special restriction on the source of the polyisobutylene, and commercially available products well known to those skilled in the art can be used.

In the present disclosure, the hot melt adhesive for insulating glass spacer comprises 25-50 parts by weight of polyisobutylene mixture, preferably 30-35 parts by weight.

In the present disclosure, the tackifying resin is preferably selected from C5 resin and/or C9 resin, more preferably C5 resin or C9 resin. In the present disclosure, there is no special restriction on the source of tackifying resin, and commercially available products of the above-mentioned C5 resin and C9 resin known by those skilled in the art can be used.

In the present disclosure, the hot melt adhesive for insulating glass spacer comprises 5-15 parts by weight of tackifying resin, preferably 5-10 parts by weight.

In the present disclosure, the tackifier is preferably selected from one or more of polyisobutylene modified by silane coupling agent, amorphous α-polyolefin modified by silane coupling agent and metallocene catalyzed vinyl copolymer modified by silane coupling agent, more preferably polyisobutylene modified by silane coupling agent, amorphous α-polyolefin modified by silane coupling agent or metallocene catalyzed vinyl copolymer modified by silane coupling agent. In the present disclosure, there is no special restriction on the source of the tackifier, and commercially available products of the above mentioned polyisobutylene modified by silane coupling agent, amorphous α-polyolefin modified by silane coupling agent and metallocene catalyzed vinyl copolymer modified by silane coupling agent well known to those skilled in the art can be used. In the present disclosure, the molecular weight of the tackifier is preferably 10,000-100,000.

In the present disclosure, the hot melt adhesive for insulating glass spacer comprises 1-15 parts by weight of tackifier, preferably 6-10 parts by weight.

In the present disclosure, the polymer is selected from one or more of styrene-butadiene rubber, an amorphous α-olefin copolymer, an ethylene-vinyl acetate copolymer, polystyrene, a styrene-butadiene-styrene copolymer, a styrene-isoprene-styrene copolymer, and a styrene-polyisobutylene-styrene copolymer, preferably an amorphous α-olefin copolymer, an ethylene-vinyl acetate copolymer, polystyrene, or a styrene-butadiene-styrene copolymer. In the present disclosure, there is no special restriction on the source of the polymer, and commercially available products of the above mentioned styrene-butadiene rubber, amorphous α-olefin copolymer, ethylene-vinyl acetate copolymer, polystyrene, styrene-butadiene-styrene copolymer, styrene-isoprene-styrene copolymer, and styrene-polyisobutylene-styrene copolymer well known to those skilled in the art can be used.

In the present disclosure, the hot melt adhesive for insulating glass spacer comprises 5-15 parts by weight of polymer, preferably 5-14 parts by weight.

In the present disclosure, the lubricant is preferably selected from one or more of Fischer-Tropsch wax C80, Fischer-Tropsch wax C100, oleamide and erucamide, more preferably Fischer-Tropsch wax C80, Fischer-Tropsch wax C100, oleamide or erucamide. In the present disclosure, there is no special restriction on the source of the lubricant, and commercially available products of the above mentioned Fischer-Tropsch wax C80, Fischer-Tropsch wax C100, oleamide and erucamide well known to those skilled in the art can be used.

In the present disclosure, the hot melt adhesive for insulating glass spacer comprises 0.1-1 part by weight of lubricant, preferably 0.5 part by weight.

In the present disclosure, the antioxidant preferably comprises a main antioxidant and an auxiliary antioxidant, more preferably consisting of a main antioxidant and an auxiliary antioxidant; the main antioxidant is preferably selected from one or more of RIANOX 1010, RIANOX 1076 and RIANOX 1790, the auxiliary antioxidant is preferably selected from one or more of RIANOX 168, RIANOX 626, RIANOX DSTP and RIANOX DLTP. In the present disclosure, there is no special restriction on the source of the antioxidant, and commercially available products well known to those skilled in the art can be used.

In the present disclosure, the hot melt adhesive for insulating glass spacer comprises 0.1-1 part by weight of antioxidant, preferably 0.5 part by weight.

In the present disclosure, the filler is preferably selected from calcium carbonate and/or talc. In the present disclosure, there is no special restriction on the source of the filler, and commercially available products well known to those skilled in the art can be used.

In the present disclosure, the hot melt adhesive for insulating glass spacer comprises 15-50 parts by weight of filler, preferably 20-35 parts by weight.

In the present disclosure, the water absorbent is preferably selected from calcium oxide and/or molecular sieve, more preferably calcium oxide or molecular sieve. In the present disclosure, there is no special restriction on the source of the water absorbent, and commercially available products of the above-mentioned calcium oxide and molecular sieve well known to those skilled in the art can be used.

In the present disclosure, the hot melt adhesive for insulating glass spacer comprises 1-10 parts by weight of the water absorbent, preferably 1-6 parts by weight.

In the present disclosure, there is no special restriction on the source of the carbon black, and commercially available products well known to those skilled in the art can be used.

In the present disclosure, the hot melt adhesive for insulating glass spacer comprises 5-25 parts by weight of carbon black, preferably 10-15 parts by weight.

In the hot melt adhesive for insulating glass spacer provided in the present disclosure, specific contents of components are used, such that relatively good overall interaction is achieved, the thixotropy of the product is good, and the adhesion to both a silicone sealant and glass is excellent.

The present disclosure also provides a preparation method of the hot melt adhesive for insulating glass spacer described in the above technical solution, comprising the following steps:

adding butyl rubber, polyisobutylene mixture, tackifying resin, tackifier, polymer, lubricant and antioxidant to a kneader successively at 130° C.-160° C., and mixing under vacuum protection for 20 min-130 min; then adding filler, water absorbent and carbon black successively, and fully mixing under vacuum protection for 60 min-180 min to obtain a hot melt adhesive for insulating glass spacer.

In the present disclosure, the butyl rubber, polyisobutylene mixture, tackifying resin, tackifier, polymer, lubricant, antioxidant, filler, water absorbent and carbon black are the same as those in the above-mentioned technical solutions, which are not elaborated here.

In the present disclosure, the preparation method is preferably specifically:

adding butyl rubber, polyisobutylene mixture, tackifying resin, tackifier, polymer, lubricant and antioxidant to a kneader successively at 135° C.-155° C., and mixing under vacuum protection for 60 min-120 min; then adding filler, water absorbent and carbon black successively, and fully mixing under vacuum protection for 90 min-150 min to obtain a hot melt adhesive for insulating glass spacer.

The preparation method provided by the present disclosure has simple process, conditions easy to be controlled and broad application prospects.

The present disclosure provides a hot melt adhesive for insulating glass spacer, which is prepared from raw materials comprising the following components: 1-10 parts by weight of butyl rubber, 25-50 parts by weight of a polyisobutylene mixture; 5-15 parts by weight of a tackifying resin; 1-15 parts by weight of a tackifier; 5-15 parts by weight of a polymer; 0.1-1 part by weight of a lubricant; 0.1-1 part by weight of an antioxidant; 15-50 parts by weight of a filler; 1-10 parts by weight of a water absorbent; and 5-25 parts by weight of carbon black, wherein the polymer is selected from one or more of styrene-butadiene rubber, an amorphous α-olefin copolymer, an ethylene-vinyl acetate copolymer, polystyrene, a styrene-butadiene-styrene copolymer, a styrene-isoprene-styrene copolymer, and a styrene-polyisobutylene-styrene copolymer. Compared with the prior art, in the hot melt adhesive for insulating glass spacer provided in the present disclosure, specific contents of components are used, such that relatively good interaction is achieved, the thixotropy of the product is good, and the adhesion to both silicone sealant and glass is excellent.

In addition, the preparation method provided by the present disclosure has simple process, conditions easy to be controlled, and broad application prospects.

In order to further illustrate the present disclosure, the following examples are used for detailed description. The raw materials used in the following examples of the present disclosure are all commercially available products.

Example 1

Under the condition of 150° C., butyl rubber, polyisobutylene, tackifying resin, tackifier, polymer, lubricant, and antioxidant were added successively to a kneader, and mixed under vacuum protection for 60 minutes; then calcium carbonate, water absorbent and carbon black were added to the mixture successively, and fully mixed under vacuum protection for 90 min, to obtain a hot melt adhesive for insulating glass spacer.

The consumption and specific types of the above-mentioned raw materials are shown in Table 1.

TABLE 1

Consumption and specific types of raw materials used in Example 1 of the present disclosure

| Component | Specific type | Consumption/kg |
|---|---|---|
| Butyl rubber | Butyl rubber with a viscosity-average molecular weight of 1,000,000 | 5 |
| Polyisobutylene | Polyisobutylene with a viscosity-average molecular weight of 70,000 | 10 |
| | Polyisobutylene with a viscosity-average molecular weight of 150,000 | 25 |
| Polymer | Amorphous α-olefin copolymer | 7 |
| Tackifier | Polyisobutylene modified by silane | 8 |
| Lubricant | Lubricant C80 | 0.5 |
| Antioxidant | Main antioxidant RIANOX 1010 | 0.2 |
| | Auxiliary antioxidant RIANOX 168 | 0.3 |
| Tackifying resin | C5 petroleum resin | 7 |
| Filler | Calcium carbonate | 23 |
| Water absorbent | Calcium oxide | 2 |
| Carbon black | Carbon black | 12 |

Example 2

Under the condition of 140° C., butyl rubber, polyisobutylene, tackifying resin, tackifier, polymer, lubricant, and antioxidant were added successively to a kneader, and mixed under vacuum protection for 80 minutes; then talc, water absorbent and carbon black were added to the mixture successively, and fully mixed under vacuum protection for 120 min, to obtain a hot melt adhesive for insulating glass spacer.

The consumption and specific types of the above-mentioned raw materials are shown in Table 2.

TABLE 2

Consumption and specific types of raw materials used in Example 2 of the present disclosure

| Component | Specific type | Consumption/kg |
|---|---|---|
| Butyl rubber | Butyl rubber with a viscosity-average molecular weight of 800,000 | 6 |
| Polyisobutylene | Polyisobutylene with a viscosity-average molecular weight of 1,300 | 3 |
| | Polyisobutylene with a viscosity-average molecular weight of 80,000 | 10 |
| | Polyisobutylene with a viscosity-average molecular weight of 200,000 | 22 |
| Polymer | Ethylene-vinyl acetate copolymer | 6 |
| Tackifier | Amorphous α-polyolefin modified by silane | 8 |
| Lubricant | Lubricant C100 | 0.5 |
| Antioxidant | Main antioxidant RIANOX 1010 | 0.2 |
| | Auxiliary antioxidant RIANOX 626 | 0.3 |
| Tackifying resin | C5 petroleum resin | 8 |
| Filler | Talc | 20 |
| Water absorbent | Molecular sieve | 6 |
| Carbon black | Carbon black | 10 |

Example 3

Under the condition of 135° C., butyl rubber, polyisobutylene, tackifying resin, tackifier, polymer, lubricant, and antioxidant were added successively to a kneader, and mixed under vacuum protection for 120 minutes; then calcium carbonate, water absorbent and carbon black were added to the mixture successively, and fully mixed under vacuum protection for 150 min, to obtain a hot melt adhesive for insulating glass spacer.

The consumption and specific types of the above-mentioned raw materials are shown in Table 3.

TABLE 3

Consumption and specific types of raw materials used in Example 3 of the present disclosure

| Component | Specific type | Consumption/kg |
|---|---|---|
| Butyl rubber | Butyl rubber with a viscosity-average molecular weight of 1,200,000 | 7 |
| Polyisobutylene | Polyisobutylene with a viscosity-average molecular weight of 2,000 | 5 |
| | Polyisobutylene with a viscosity-average molecular weight of 250,000 | 25 |
| Polymer | Polystyrene | 14 |
| Tackifier | Metallocene-catalyzed vinyl copolymers modified by silane | 6 |
| Lubricant | Oleamide | 0.5 |
| Antioxidant | Main antioxidant RIANOX 1790 | 0.2 |
| | Auxiliary antioxidant RIANOX 626 | 0.3 |
| Tackifying resin | C9 petroleum resin | 10 |
| Filler | Calcium carbonate | 20 |
| Water absorbent | Molecular sieve | 2 |
| Carbon black | Carbon black | 10 |

Example 4

Under the condition of 155° C., butyl rubber, polyisobutylene, tackifying resin, tackifier, polymer, lubricant, and antioxidant were added successively to a kneader, and mixed under vacuum protection for 60 minutes; then calcium carbonate, water absorbent and carbon black were added to the mixture successively, and fully mixed under vacuum protection for 120 min, to obtain a hot melt adhesive for insulating glass spacer.

The consumption and specific types of the above-mentioned raw materials are shown in Table 4.

TABLE 4

Consumption and specific types of raw materials used in Example 4 of the present disclosure

| Component | Specific type | Consumption/ kg |
|---|---|---|
| Butyl rubber | Butyl rubber with a viscosity-average molecular weight of 1,500,000 | 5 |
| Polyisobutylene | Polyisobutylene with a viscosity-average molecular weight of 80,000 | 15 |
| | Polyisobutylene with a viscosity-average molecular weight of 300,000 | 15 |
| Polymer | Amorphous α-olefin copolymer | 5 |
| Tackifier | Polyisobutylene modified by silane | 8 |
| Lubricant | Erucamide | 0.5 |
| Antioxidant | Main antioxidant RIANOX 1010 | 0.2 |
| | Auxiliary antioxidant RIANOX 626 | 0.3 |
| Tackifying resin | C5 petroleum resin | 5 |
| Filler | Calcium carbonate | 35 |
| Water absorbent | Calcium oxide | 1 |
| Carbon black | Carbon black | 10 |

Example 5

Under the condition of 155° C., butyl rubber, polyisobutylene, tackifying resin, tackifier, polymer, lubricant, and antioxidant were added successively to a kneader, and mixed under vacuum protection for 60 min; then calcium carbonate, talc, water absorbent and carbon black were added to the mixture successively, and fully mixed under vacuum protection for 120 min, to obtain a hot melt adhesive for insulating glass spacer.

The consumption and specific types of the above-mentioned raw materials are shown in Table 5.

TABLE 5

Consumption and specific types of raw materials used in Example 5 of the present disclosure

| Component | Specific type | Consumption/ kg |
|---|---|---|
| Butyl rubber | Butyl rubber with a viscosity-average molecular weight of 1,000,000 | 5 |
| Polyisobutylene | Polyisobutylene with a viscosity-average molecular weight of 2,000 | 4 |
| | Polyisobutylene with a viscosity-average molecular weight of 60,000 | 10 |
| | Polyisobutylene with a viscosity-average molecular weight of 180,000 | 20 |
| Polymer | Styrene-butadiene-styrene copolymer | 6 |
| Tackifier | Polyisobutylene modified by silane | 10 |
| Lubricant | Lubricant C100 | 0.5 |
| Antioxidant | Main antioxidant RIANOX 1076 | 0.2 |
| | Auxiliary antioxidant RIANOX DSTP | 0.3 |
| Tackifying resin | C9 petroleum resin | 7 |
| Filler | Calcium carbonate | 10 |
| | Talc | 10 |
| Water absorbent | Molecular sieve | 2 |
| Carbon black | Carbon black | 15 |

Comparative Example 1

(1) Under the condition of 130-160° C. (preferably 145° C.), butyl rubber, polyisobutylene, phthalate, ethylene ethyl acrylate copolymer, naphthenic oil, and antioxidant 1010 were added to a kneader successively, and mixed under vacuum protection for 30 min to obtain a mixture 1;

(2) Calcium carbonate, water-absorbing powder and carbon black were added to the mixture 1 successively, and fully mixed under vacuum protection for 60 min to obtain a mixture 2;

(3) γ-aminopropyltrimethoxysilane was added to the mixture 2, mixed under vacuum for 60 min, and extruded to obtain a hot melt spacer for insulating glass.

The consumption and specific types of the above-mentioned raw materials are shown in Table 6.

TABLE 6

Consumption and specific types of raw materials used in Comparative example 1

| Component | Specific type | Consumption/ kg |
|---|---|---|
| Butyl rubber | Butyl rubber with a viscosity-average molecular weight of 300,000 | 6 |
| Polyisobutylene | Polyisobutylene with a viscosity-average molecular weight of 70,000 | 60 |
| Phthalate | Phthalate | 10 |
| Polymer | Ethylene ethyl acrylate copolymer | 6 |
| Naphthenic oil | Naphthenic oil | 1 |
| Antioxidant | Antioxidant 1010 | 5 |
| γ-aminopropyl-trimethoxysilane | γ-aminopropyltrimethoxysilane | 2.5 |
| Filler | Calcium carbonate | 25 |
| Water absorbent | Water-absorbing powder | 1 |
| Carbon black | Carbon black | 15 |

Comparative Example 2

Under the condition of 130-160° C. (preferably 145° C.), butyl rubber, polyisobutylene, tackifying resin, polymer, lubricant, and antioxidant were added successively to a kneader, and mixed under vacuum protection for 60 minutes; then calcium carbonate, water absorbent and carbon black were added to the mixture successively, and fully mixed under vacuum protection for 90 min, to obtain a hot melt adhesive for insulating glass spacer.

The consumption and specific types of the above-mentioned raw materials are shown in Table 7.

TABLE 7

Consumption and specific types of raw materials used in Comparative example 2

| Component | Specific type | Consumption/ kg |
|---|---|---|
| Butyl rubber | Butyl rubber with a viscosity-average molecular weight of 1,000,000 | 5 |
| Polyisobutylene | Polyisobutylene with a viscosity-average molecular weight of 70,000 | 10 |
| | Polyisobutylene with a viscosity-average molecular weight of 150,000 | 25 |
| Polymer | Amorphous α-olefin copolymer | 15 |
| Lubricant | Lubricant C80 | 0.5 |
| Antioxidant | Main antioxidant RIANOX 1010 | 0.2 |
| | Auxiliary antioxidant RIANOX 168 | 0.3 |

TABLE 7-continued

Consumption and specific types of raw materials used in Comparative example 2

| Component | Specific type | Consumption/ kg |
|---|---|---|
| Tackifying resin | C5 petroleum resin | 7 |
| Filler | Calcium carbonate | 23 |
| Water absorbent | Calcium oxide | 2 |
| Carbon black | Carbon black | 12 |

Comparative Example 3

Under the condition of 130-160° C. (preferably 145° C.), butyl rubber, polyisobutylene, tackifying resin, tackifier, lubricant, and antioxidant were added successively to a kneader, and mixed under vacuum protection for 60 minutes; then calcium carbonate, water absorbent and carbon black were added to the mixture successively, and fully mixed under vacuum protection for 90 min, to obtain a hot melt adhesive for insulating glass spacer.

The consumption and specific types of the above-mentioned raw materials are shown in Table 8.

TABLE 8

Consumption and specific types of raw materials used in Comparative example 3

| Component | Specific type | Consumption/ kg |
|---|---|---|
| Butyl rubber | Butyl rubber with a viscosity-average molecular weight of 1,000,000 | 5 |
| Polyisobutylene | Polyisobutylene with a viscosity-average molecular weight of 1,300 | 5 |
| | Polyisobutylene with a viscosity-average molecular weight of 70,000 | 17 |
| | Polyisobutylene with a viscosity-average molecular weight of 150,000 | 20 |
| Tackifier | Polyisobutylene modified by silane | 8 |
| Lubricant | Lubricant C80 | 0.5 |
| Antioxidant | Main antioxidant RIANOX 1010 | 0.2 |
| | Auxiliary antioxidant RIANOX 168 | 0.3 |
| Tackifying resin | C5 petroleum resin | 7 |
| Filler | Calcium carbonate | 31 |
| Water absorbent | Molecular sieve | 5 |
| Carbon black | Carbon black | 1 |

The various performance of the hot melt adhesives for insulating glass spacer provided in Examples 1-5 and Comparative examples 1-3 was tested. The test method is as follows:

Thixotropy evaluation method: 30 g hot melt adhesive was used to prepare spherical samples. The spherical samples were placed on a glass plate at 23° C. After 48 hours, the contact area between the hot melt adhesive sample and the glass plate was checked, so as to determine whether the thixotropy of different samples was good or not. If the contact area between the hot melt adhesive and the glass plate remained unchanged, the thixotropy was evaluated as excellent; if the contact area between the hot melt adhesive and the glass plate increased slightly, the thixotropy was evaluated as good; if the contact area between the hot melt adhesive and the glass plate increased significantly, the thixotropy was evaluated as poor.

Adhesion to glass/aluminum sheet test method: 100*25*3 mm glass sheet and 100*25*2 mm aluminum sheet were used as the base material. The glass/aluminum sheet was wiped with alcohol and dried. A suitable size of heat melt adhesive was cut out, and glued with the glass sheet to make a test sample with a contact area of 25*25 mm. The sample was maintained under standard conditions for 48 hours. The test was performed according to GB/T7124-2008, to measure the adhesion strength of hot melt adhesive to glass-aluminum sheet.

Adhesion to silicone sealant test method: 100*25*3 mm glass sheet was used as the base material. The glass sheet was wiped with alcohol and dried. The hot melt adhesive was pressed into an adhesive sheet with a thickness of 2 mm, which was cut out an appropriate size and glued with the glass sheet; then two-component silicone sealant was applied on the surface of the hot melt adhesive in a thickness of 2 mm, which was immediately glued with another glass sheet having hot melt adhesive to make a test sample. After the test sample was maintained under standard conditions for 48 hours, the test was performed according to GB/T7124-2008, to measure the adhesion strength of hot melt adhesive to two-component silicone sealant.

The results are shown in Table 9.

TABLE 9

Various performance data of the hot melt adhesives for insulating glass spacer provided by Examples 1-5 and Comparative examples 1-3

| | Thixotropy | Adhesion strength (glass-aluminum sheet) Mpa | Adhesion strength (silicone sealant) MPa |
|---|---|---|---|
| Example 1 | Excellent | 0.40 | 0.33 |
| Example 2 | Excellent | 0.41 | 0.29 |
| Example 3 | Excellent | 0.36 | 0.32 |
| Example 4 | Excellent | 0.38 | 0.28 |
| Example 5 | Excellent | 0.43 | 0.35 |
| Comparative example 1 | Excellent | 0.41 | 0.05 |
| Comparative example 2 | Excellent | 0.21 | 0.03 |
| Comparative example 3 | Poor | 0.25 | 0.11 |

It can be seen from Table 1 that the hot melt adhesives for insulating glass spacer provided in Examples 1-5 of the present disclosure have good thixotropy, good adhesion to glass and aluminum, and excellent adhesion to silicone sealant.

The above are only the preferred embodiments of the present disclosure. It should be noted that for those of ordinary skill in the art, several improvements and modifications can be made without departing from the principle of the present disclosure, which should also be regarded as the protection scope of the present disclosure.

The invention claimed is:

1. A hot melt adhesive for insulating glass spacer, prepared from raw materials comprising the following components:
  1-10 parts by weight of butyl rubber;
  25-50 parts by weight of a polyisobutylene mixture;
  5-15 parts by weight of a tackifying resin;
  1-15 parts by weight of a tackifier;
  5-15 parts by weight of a polymer;
  0.1-1 part by weight of a lubricant;
  0.1-1 part by weight of an antioxidant;
  15-50 parts by weight of a filler;

1-10 parts by weight of a water absorbent;
5-25 parts by weight of carbon black;
wherein the polymer is selected from the group consisting of one or more of styrene-butadiene rubber, an amorphous α-olefin copolymer, an ethylene-vinyl acetate copolymer, polystyrene, a styrene-butadiene-styrene copolymer, a styrene-isoprene-styrene copolymer, and a styrene-polyisobutylene-styrene copolymer, the butyl rubber has a viscosity-average molecular weight of 800,000-1,500,000, the tackifier is selected from the group consisting of one or more of polyisobutylene modified by silane coupling agent, amorphous α-polyolefin modified by silane coupling agent and metallocene catalyzed vinyl copolymer modified by silane coupling agent.

2. The hot melt adhesive for insulating glass spacer according to claim 1, wherein the polyisobutylene mixture is selected from the group consisting of two or more of low molecular weight polyisobutylene, medium molecular weight polyisobutylene and high molecular weight polyisobutylene; the low molecular weight polyisobutylene has a viscosity-average molecular weight of 1,000-30,000, the medium molecular weight polyisobutylene has a molecular weight of 30,000-100,000, and the high molecular weight polyisobutylene has a molecular weight of 100,000-2,000,000.

3. The hot melt adhesive for insulating glass spacer according to claim 1, wherein the tackifying resin is selected from the group consisting of C5 resin and C9 resin.

4. The hot melt adhesive for insulating glass spacer according to claim 1, wherein the lubricant is selected from the group consisting of one or more of Fischer-Tropsch wax C80, Fischer-Tropsch wax C100, oleamide and erucamide.

5. The hot melt adhesive for insulating glass spacer according to claim 1, wherein the antioxidant comprises a main antioxidant and an auxiliary antioxidant; the main antioxidant is selected from the group consisting of one or more of tetrakismethylene(3,5-di-t-butyl-4-hydroxyhydrocinnamate)methane, octadecyl-3-(3',5'-di-t-butyl-4'-hydroxyphenyl)propionate and 1,3,5-tris(4-tert-butyl-3-hydroxy-2,6-dimethylbenzyl)-1,3,5-triazine-2,4,6-(1H,3H,5H)-trione, and the auxiliary antioxidant is selected from the group consisting of one or more of tris(2,4-di-tert-butylphenyl) phosphite, bis(2,4-di-t-butylphenyl) pentaerythritol diphosphite, dioctadecyl3,3'-thiodipropionate and dilauryl 3,3'-thiodipropionate.

6. The hot melt adhesive for insulating glass spacer according to claim 1, wherein the filler is selected from the group consisting of calcium carbonate and talc.

7. The hot melt adhesive for insulating glass spacer according to claim 1, wherein the water absorbent is selected from the group consisting of calcium oxide and molecular sieves.

8. A preparation method of the hot melt adhesive for insulating glass spacer according to claim 1, comprising the following steps:
adding butyl rubber, polyisobutylene mixture, tackifying resin, tackifier, polymer, lubricant and antioxidant to a kneader successively at 130° C.-160° C., and mixing under vacuum protection for 20 min-130 min; then adding filler, water absorbent and carbon black successively, and fully mixing under vacuum protection for 60 min-180 min to obtain a hot melt adhesive for insulating glass spacer.

* * * * *